United States Patent [19]
McGarvey

[11] Patent Number: 5,087,085
[45] Date of Patent: Feb. 11, 1992

[54] SEALING SYSTEM FOR CONNECTING BEADED AND FLAT COUPLING HARDWARE

[75] Inventor: Raymond McGarvey, Bethesda, Md.

[73] Assignee: General Components, Inc., Rockville, Md.

[21] Appl. No.: 599,069

[22] Filed: Oct. 17, 1990

[51] Int. Cl.⁵ .............................................. F16L 19/00
[52] U.S. Cl. ............................... 285/328; 285/332.4; 285/349; 285/910; 285/917; 285/918; 285/353
[58] Field of Search ............ 285/328, 340, 332.1, 285/332.2, 332.3, 334.2, 334.4, 917, 233, 354, 918, 349, 910; 277/1, 167.5, 168, 178, 236, 207

[56] References Cited

U.S. PATENT DOCUMENTS

| | | | |
|---|---|---|---|
| 3,285,631 | 6/1963 | Stolpman | 285/918 X |
| 3,521,910 | 11/1968 | Callahan, Jr. et al. | 277/236 |
| 3,580,617 | 5/1971 | Ehrenberg | 285/354 |
| 3,989,285 | 11/1976 | Yancey | 285/363 |
| 4,225,161 | 9/1980 | Smith | 285/349 X |
| 4,324,424 | 4/1982 | Woodliff et al. | 285/354 |
| 4,361,331 | 11/1982 | Kohler | 277/236 |
| 4,396,199 | 8/1983 | Boyd et al. | 251/306 |
| 4,616,860 | 10/1986 | Faria | 285/368 |
| 4,664,427 | 5/1987 | Johnston | 285/340 |
| 4,854,597 | 8/1989 | Leigh | 285/340 |
| 4,964,657 | 10/1990 | Gonzales | 285/340 |

FOREIGN PATENT DOCUMENTS 8903495 10/1987 France .................................. 285/354

Primary Examiner—Dave W. Arola
Attorney, Agent, or Firm—Lane, Aitken & McCann

[57] ABSTRACT

In a system for providing a direct sealing connection between flat coupling hardware and VCR-type coupling hardware, a gasket is provided having a conical inwardly facing side surface to engage the toroidal projection on the endface of the VCR-type coupling hardware. The opposite side surface of the gasket is provided with an internal shoulder to receive a metal O-ring to be sandwiched between the gasket and the flat end surface of the flat coupling hardware.

15 Claims, 1 Drawing Sheet

SEALING SYSTEM FOR CONNECTING BEADED AND FLAT COUPLING HARDWARE

BACKGROUND OF THE INVENTION

This invention relates to a system for providing an improved seal to a conduit having a flat surface and to a novel gasket used in such a system.

There are many applications in which a conduit or fluid flow component has coupling hardware with a flat end surface at which the conduit or component is to be connected to another conduit. Typically, to provide a sealing connection to such a flat coupling hardware in vacuum or high pressure applications, or applications requiring an ultra high purity, a metal O-ring or C-ring is used to provide the sealing engagement. In such coupling hardware, a problem exists in maintaining the sealing ring centered. If the sealing ring is not centered, it interferes with the flow path through the coupling hardware and if it moves after pressure is applied to the coupling hardware to achieve sealing engagement, this action may cause scratching of the sealing surfaces resulting in leaks. In addition, the surfaces against which the sealing ring seals must be machined with a relatively high degree of precision to achieve a good sealing engagement. If the sealing ring could be maintained centered with assurance, the sealing area over which the precision machining must be carried out could be reduced thus reducing the cost of the coupling hardware.

Another problem with coupling hardware having flat sealing surfaces is that it is frequently desirable to make a connection between such a fitting and VCR coupling hardware which has a toroidal bead on an endface to make sealing engagement with the gasket. When a VCR-type conduit has to be connected to a fitting having a flat surface, it is necessary in the present state of the art to provide a transitional fluid connector having one end designed to make sealing engagement with the flat surface of the flat coupling hardware and the other end of the conduit formed with a toroidal bead to connect with a VCR-type conduit. It would be a great convenience to be able to make a direct connection between flat coupling hardware having a flat sealing surface and a VCR-type conduit having a toroidal bead on its endface.

One place where such a sealing system could be used would be in valve fittings. Typically, the coupling hardware on valves are provided with female threads and are designed either with flat sealing surfaces or with toroidal beads to make connection to VCR-type conduits. To save cost, it would be preferable to make the sealing surface of the valve fitting flat rather than with a toroidal bead, but such structure means that the coupling hardware cannot connect directly to a VCR-type fluid conduit in the present state of the art.

Sometimes the fluid system to which the valve must connect does not employ VCR-type coupling hardware and if the available valves to be connected to such a fluid system are provided with a VCR-type coupling hardware, a transitional connector must also be provided between the two systems in this situation. This problem arises because the valves are expensive and it is not economical to keep both valves with both flat coupling hardware and VCR-type coupling hardware in stock.

SUMMARY OF THE INVENTION

The present invention provides a gasket structure which enables VCR-type coupling hardware to be connected directly to the flat coupling hardware and at the same time, automatically centers the sealing ring which is used in the gasket structure to make sealing engagement with the flat coupling hardware. In accordance with the invention, a gasket is provided on one side with a conical surface facing inwardly toward the axis shaped and sized to engage the toroidal bead on the endface of a VCR-type coupling hardware component. The other side of the gasket is provided with a flat surface on the radially outer portion to engage the flat surface of flat coupling hardware and is also provided with an internal shoulder on the radial inner portion of the gasket for receiving a metal O-ring. When the gasket is assembled with a metal O-ring, it is positioned between the VCR-type coupling hardware and flat coupling hardware, with the conical surface of the gasket engaging the toroidal bead on the endface of the VCR-type coupling hardware. The gasket will provide an excellent problem-free seal with the VCR-type coupling hardware and with the flat coupling hardware suitable for use in high vacuum, high pressure and ultra clean applications. The conical endface of the gasket centers the gasket on the axis of the VCR-type coupling hardware and holds it and the O-ring centered between the flat coupling hardware and the VCR coupling hardware.

DESCRIPTION OF THE PREFERRED EMBODIMENT

Figure 1:
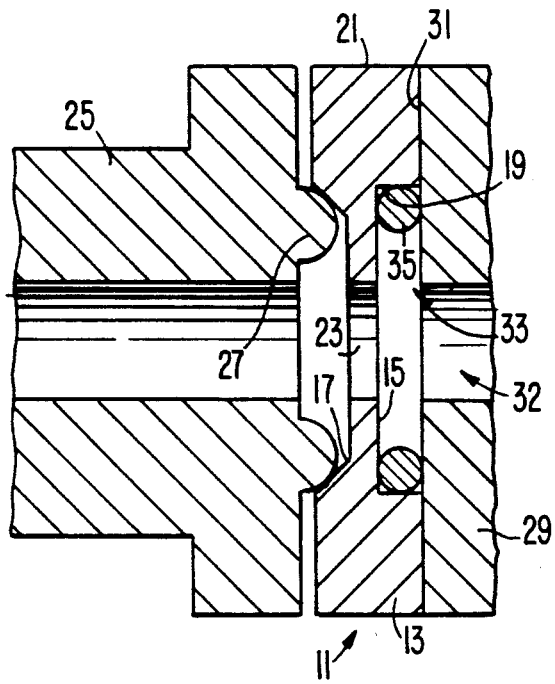
FIG. 1 is an axial sectional view showing the gasket O-ring assembly of the invention in place between VCR-type coupling hardware and flat coupling hardware.

As shown in FIG. 1, the circular gasket of the invention designated by the reference number 11 has a radially outer section 13 of greater axial dimension than its radial inner section 15, which is axially centered with respect to the outer section 13. On one side of the gasket 11, the sidewall of the gasket tapers inwardly from the outer section 13 to the inner section 15 to define a conical surface 17 facing inwardly toward the axis of the gasket. On the other side of the gasket, the radially outer portion of the gasket is connected to the radially inner portion of the gasket by an axially extending step to define an internal shoulder 19 in the form of an inwardly facing cylindrical surface. The side surfaces of the gasket 11 are planar and perpendicular to the axis of the gasket between the conical surface 17 and outer cylindrical surface 21 of the gasket and between the internal shoulder 19 and the outer cylindrical surface 21 of the gasket 11 and also between the conical surface 17 and the inner cylindrical surface 23 of the gasket and between the shoulder 19 and the inner cylindrical surface 23 of the gasket. VCR-coupling hardware, such as the gland 25, makes sealing engagement with the conical surface 17. By definition VCR-type coupling hardware will have a radial endface with a projecting toroidal bead 27 positioned near the fluid passageway wall 29 of the coupling hardware. The toroidal bead 27, as shown in FIG. 1, has semicircular profile which makes sealing engagement with the conical surface 17. The flat coupling hardware 29 to which sealing engagement must be made has a radial flat surface 31 surrounding the fluid passageway 32 of the coupling hardware and to which sealing engagement must be made. The outer radial flat surface of the gasket 11 engages the flat surface 31 of the flat coupling hardware 29 so that an annular pocket 33 is defined between the flat surface 31 and the flat surface of the gasket 11 extending between the shoulder 19 and the inner cylindrical surface 23 of the gasket. In this pocket 33, a metal O-ring 35 is provided to achieve sealing engagement between the gasket 11 and the flat surface 31. The ring 35, instead of being an O-ring, could also be a metal C-ring. The axial dimension of the O-ring is slightly larger than the axial length of the shoulder 19 so that the O-ring is compressed in the pocket 33. Means are provided, not shown in FIG. 1, to force the VCR-type coupling hardware toward the flat coupling hardware 29 sandwiching the gasket 11 and O-ring 35 assembly between the coupling hardware.

Figure 2:
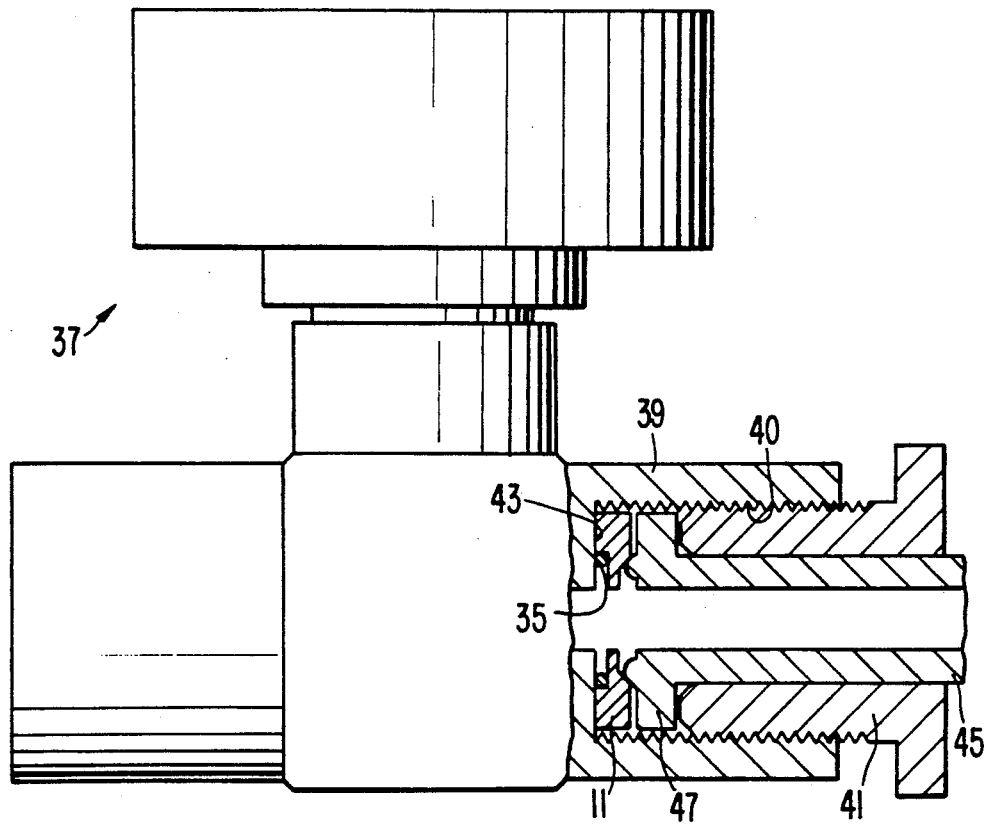
FIG. 2 illustrates a valve in partial axial section connected to a conduit making use of the gasket O-ring assembly of the present invention.

FIG. 2 shows a typical application for the system of FIG. 1 and comprises a valve 37 having flat coupling hardware 39 for coupling the fluid inlet or outlet of the valve to a VCR-type fluid conduit. As is typical with such valves for high pressure, vacuum, or ultra clean applications, the coupling hardware is provided with female threads 40 to be engaged by a male nut 41. At the inner end of the female threads is the flat sealing radial surface 43 of the flat coupling hardware extending radially inward from the female threads 40. It will be apparent that it would be substantially more difficult and expensive to form the coupling hardware 39 as beaded VCR coupling hardware instead of flat coupling hardware. Extending into the internally threaded aperture of the coupling hardware 39 is a VCR-type gland 45 having an endface with a toroidal bead similar to the gland 25 of FIG. 1. Sandwiched between the gland 25 and the flat surface 43 is a gasket and O-ring assembly, comprising a gasket 11 and O-ring 35, coacting with the gland 45 and the flat surface 43 in exactly the same manner as it does with the corresponding components in the system as illustrated in FIG. 1. The gland 45 is provided with a flange 47 adjacent to its endface and the male nut 41 which surrounds the gland 45 when it is screwed into the female threads 40 engages the flange 47 and forces the gland 45 toward the flat surface 43. In this manner, the gasket and O-ring assembly is sandwiched between the gland 45 and the flat surface 43 with axial pressure applied by the male nut 41.

It will be apparent that the gasket and O-ring assembly of the invention could provide sealing engagement between VCR-coupling hardware in a valve and a conduit having flat coupling hardware on its endface simply by axially reversing the gasket and O-ring assembly. Also, the gasket and O-ring assembly can also serve to provide a direct connection between conduits having VCR-type coupling hardware and flat coupling hardware, respectively.

The above description is of a preferred embodiment of the invention and modification may be made thereto without departing from the spirit and scope of the invention which is defined in the appended claims.

I claim:

1. A gasket comprising a radially outer section and a radially inner section of a smaller axial dimension than said radially outer section and located axially between axial ends of said radially outer section, a conical surface on one side of said gasket extending between said radially outer section and said radially inner section and forming a junction with said radially outer section, the other side of said gasket comprising a flat radial outer surface and a flat radial inner surface axially opposite said conical surface and connected to said flat radial outer surface by a shoulder extending inwardly from said flat radially outer surface to said flat radial inner surface in substantial axial alignment with the junction between said conical surface and said radially outer surface, and wherein said shoulder comprises a cylindrical surface.

2. A gasket and sealing ring assembly comprising a radially outer section and a radially inner section of a smaller axial dimension than said radially outer section and located axially between axial ends of said radially outer section, a conical surface on one side of said gasket extending between said radially outer section and said radially inner section, the other side of said gasket comprising a flat radial outer surface and a flat radial inner surface opposite said conical surface and connected to said flat radial outer surface by a shoulder extending inwardly from said flat radially outer surface to said flat radial inner surface, and a sealing ring positioned in a space defined between said flat radial inner surface and said shoulder, said sealing ring when unstressed having an axial dimension greater than the axial length of said shoulder.

3. A gasket and sealing ring assembly as recited in claim 2, wherein said sealing ring is a metal sealing ring.

4. A gasket and sealing ring assembly as recited in claim 2, wherein said sealing ring is a metal O-ring.

5. A gasket and sealing ring assembly comprising a radially outer section and a radially inner section of a smaller axial dimension than said radially outer section, a conical surface on one side of said gasket extending between said radially outer section and said radially inner section and facing toward an axis of said assembly, the other side of said gasket comprising a flat radial inner surface and a flat radial outer surface connected by a shoulder extending inwardly from said flat radial outer surface to said flat radial inner surface, and a sealing ring positioned in a space defined between said shoulder and said flat radial inner surface, said sealing ring when unstressed having an axial dimension greater than the axial length of said shoulder.

6. A gasket and sealing ring assembly as recited in claim 5, wherein said sealing ring comprises a metal sealing ring.

7. A gasket and sealing ring assembly as recited in claim 5, wherein said sealing ring comprises a metal O-ring.

8. A sealing connection between flat coupling hardware and a second type coupling hardware, wherein said flat coupling hardware contains a fluid passage surrounded by a flat end surface and said second type coupling hardware contains a fluid passage surrounded by a radially extending endface having a toroidal bead projecting from said endface comprising a gasket sandwiched between said flat coupling hardware and said second type couple hardware, said gasket having a nonplanar radially extending side surface in sealing engagement with said toroidal bead and having on the opposite side of the gasket from said nonplanar radially extending surface a radially extending outer surface and a flat radially extending inner surface connected by a shoulder facing toward the axis of said gasket, a sealing ring sandwiched between said flat radially extending inner surface and said flat surface of said flat coupling hardware and making sealing engagement with said flat radially extending inner surface and said flat surface of said flat coupling hardware.

9. A sealing connection as recited in claim 8, wherein said nonplanar radially extending surface comprises an inwardly facing conical surface.

10. A sealing connection as recited in claim 8, wherein said sealing ring is a metal sealing ring.

11. A sealing connection as recited in claim 8, wherein said sealing ring is a metal O-ring.

12. A sealing connection as recited in claim 8, wherein means are provided to apply axial force to compress said gasket and sealing ring between said second type coupling hardware and said flat coupling hardware.

13. A sealing connection as recited in claim 8, wherein said sealing ring engages said flat radially extending inner radial surface at a location axially opposite to said nonplanar surface.

14. A sealing connection as recited in claim 8, wherein said shoulder comprises a cylindrical surface.

15. A sealing connection as recited in claim 8, wherein said radially extending outer surface comprises a flat surface engaging the flat surface of said flat coupling hardware.

* * * * *